April 6, 1971 JIRO KIJIMA ET AL 3,574,066
MULTISTAGE EVAPORATION UNIT AND GAS-LIQUID DIRECT
CONTACT DISTILLATION APPARATUS
Filed Nov. 4, 1968 3 Sheets-Sheet 3

INVENTORS
Jiro Kijima
Toshio Bekki
BY George B. Oujinek
ATTORNEY

United States Patent Office 3,574,066
Patented Apr. 6, 1971

3,574,066
MULTISTAGE EVAPORATION UNIT AND GAS-LIQUID DIRECT CONTACT DISTILLATION APPARATUS
Jiro Kijima and Toshio Bekki, Yokohama, Japan, assignors to Kurita Industrial Company, Limited, Osaka, Japan
Filed Nov. 4, 1968, Ser. No. 773,210
Claims priority, application Japan, Feb. 19, 1968, 43/10,223
Int. Cl. B01d 3/06
U.S. Cl. 202—173
1 Claim

ABSTRACT OF THE DISCLOSURE

A water purification apparatus comprising a gas-liquid contacting device for bringing hot water into contact with a gas to evaporate a part of said water, a water vapor condenser, means to introduce the water vapor-containing gas discharging from said gas-liquid contacting device into said water vapor condenser, means to feed hot water into said gas-liquid contacting device, and means in said water vapor condenser to cool the steam.

---

This invention relates to a water purification apparatus. More particularly, this invention relates to an apparatus for purifying water by bringing hot water into contact with air or an inert gas under substantially atmospheric pressure to generate water vapor the temperature of which is not much lower than that of said hot water and condensing said water vapor into water.

In conventional water purification apparatuses which are of the type effecting flash evaporation under reduced pressure, the evaporator must be designed as a pressure vessel, and it is further necessary to use a vacuum pump for reducing the pressure and to use a low N.P.S.H. pump of high efficiency for withdrawing the brine used or the fresh water produced. As a result, the cost of the equipment and the water-purification cost both become extremely high. This tendency is strikingly apparent in modern water purification apparatuses of the multistage type wherein, to raise the water-purification efficiency, the temperature of the impure water to be fed into the evaporator in the first stage is sometimes elevated to 150° C. and, accordingly, the pressure reaches 4.8 kg./cm.² In the final stage, the temperature is lowered as much as possible to make the degree of vacuum 720 mm. Hg (35° C.). Further, the flash-evaporation type is defective in that, because of flash evaporation being effected under reduced pressure, the steam temperature becomes strikingly lower than the original hot-water temperature, and, therefore, it becomes necessary to use a cooling water of a lower temperature in condensing the steam. For example, in steam driven electric generation plants, engines for ships, brine evaporating apparatuses, etc., a large amount of cooling water is required and brine is used as such cooling water. In this case, the brine used is usually warmed to about 40° C., so, if it is flash-evaporated under reduced pressure, the temperature of the steam generated becomes close to that of fresh brine which is not used for cooling, and, accordingly, the steam generated can no longer be condensed with brine.

This invention aims to eliminate the defects mentioned above which are inherent in conventional apparatuses by a simple practical method.

According to this invention, hot water is brought into contact with air or inert gas (hereinafter referred to simply as "gas") under substantially atmospheric pressure, and thereby evaporated in part into the gas stream, which is then cooled to recover the water contained therein, and therefore the evaporator need not be designed as a pressure vessel, nor does it become necessary to use a vacuum pump for pressure reduction or a pump for withdrawing the brine used or the fresh water produced.

In accordance with one characteristic feature of this invention, it differs from the system of flash evaporation under saturation temperature and saturation pressure in that there is little adhesion of scales or depositing of salt and, further, the efficiency of operation is not lowered even if the gas-liquid contact device is not completely sealed.

In accordance with another feature of this invention, water vapor evaporated from brine which is approximately 40° C. after having been used to cool the engine can be easily converted to fresh water by condensing it through the use of the brine that is being used as the coolant for the engine since the temperature of the water vapor is not much below 40°.

In accordance with another feature of this invention the waste water from thermal electric plants, ship engines, sea water evaporators, etc. is used as the warm water which is evaporated to produce fresh water and thus with the exception of the power used to drive the fan no external power source is necessary.

In accordance with another feature of this invention, the apparatus itself is light and small in size as the evaporator serves only to bring the gas into contact with water and thus the conventional cooling tower, filling tower, and spray tower can be used with only slight modification.

The characteristic features of this invention will become apparent from the following explanation in respect of the drawing illustrating specific embodiments of this invention. In the drawing.

Figure 1:
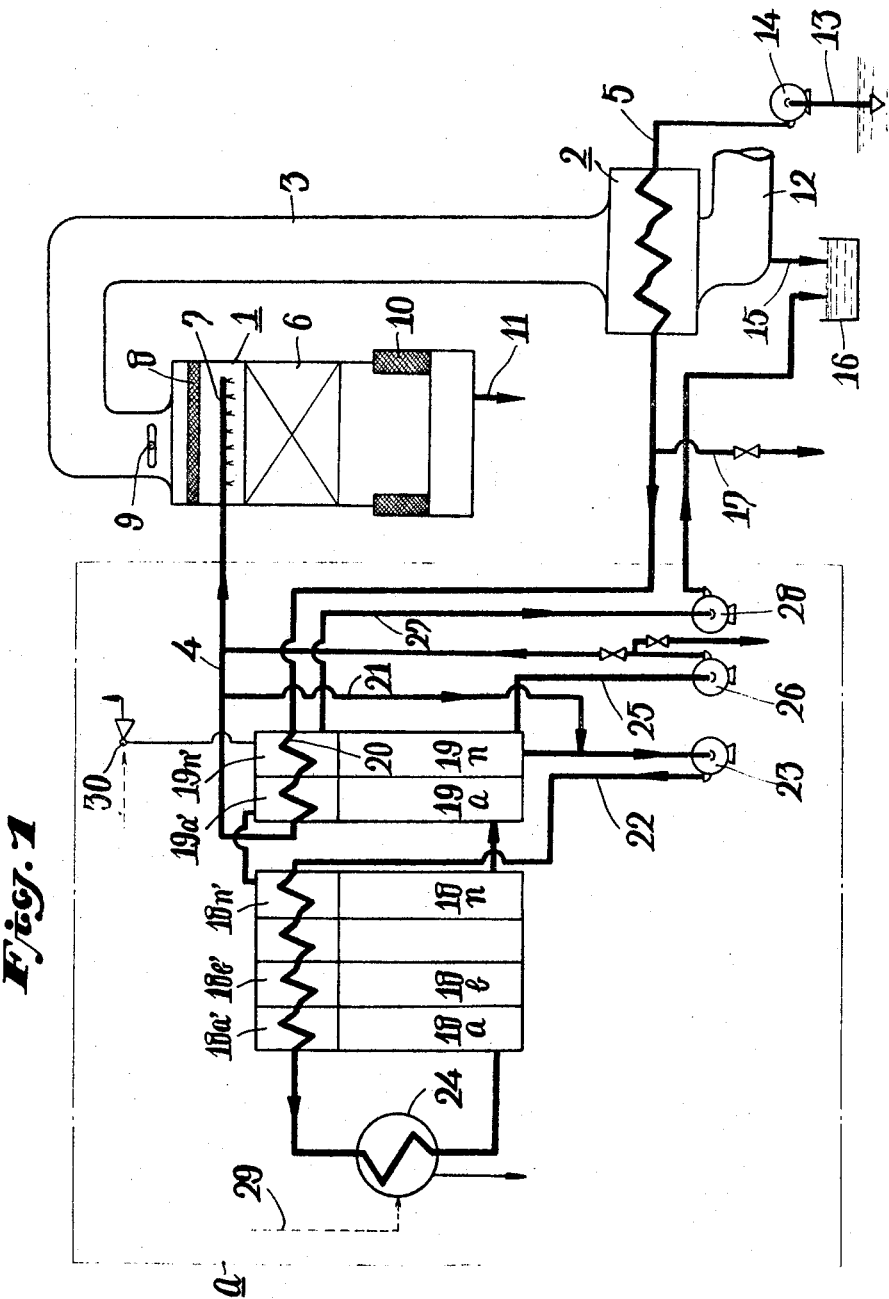
FIG. 1 is a schematic view of one embodiment of this invention for making fresh water from the water used as the cooling water for a multistage flash evaporation-type water purification machine.

Referring to FIG. 1, 1 is a gas-liquid contacting device, 2 is a water vapor condenser, 3 is a passage through which gas containing water vapor travels from gas-liquid contacting device 1 to water vapor condenser 2, 4 is a supply pipe for the warmed water, and 5 is a cooling pipe through which the cooling water passes. In this embodiment, the water is fed into supply pipe 4 after being warmed by a multi-stage flash evaporation-type water purification machine *a*; that is, fresh water is made from the brine used as the cooling water for evaporators of said machine *a*.

Gas-liquid contacting device 1 is shown with a filling tower, at the middle of which filling material 6 is disposed, and above filling material 6 are disposed spray nozzle 7, eliminator 8 and fan 9 in the order mentioned. One end of passage 3 is connected to the upper end of gas-liquid contacting device 1, and supply pipe 4 is connected to spray nozzle 7.

In device 1, gas inlet 10 opens at a position below filling material 6, and drain pipe 11 is connected to the bottom of device 1.

Drain pipe 12 is connected to water vapor condenser 2, and cooling pipe 5 is disposed so as to pass through water vapor condenser 2.

The water drawn up by pump 14 through water intake pipe 13 is fed into cooling pipe 5. 15 is a drain pipe, 16 is a drain tank, and 17 is a drain pipe for the cooling water which has passed through cooling pipe 5 in water vapor condenser 2.

The multistage flash evaporation-type water purification machine *a* has a first group of evaporators 18*a*–18*n* and a second group of evaporators 19*a*–19*n*, the evaporators of each group being connected with one another at the bottom and said evaporator groups being provided with condensers 18*a'*–18*n'* and 19*a'* and 19*n'* respectively. Cooling pipe 5 branches off from drain pipe 17 and connects to cooling pipe 20 which passes through the condensers of the second evaporator group in the order of 19*n'*–19*a'*, cooling pipe 20 branching off and connecting to supply pipe 4 and to water supply pipe 21 of water purification machine. Water supply pipe 21 is connected to circulating pipe 22 which, starting from the last evaporator 19*n* of the second evaporator group, passes through pump 23 and then through the condensers of the first evaporator group in the order of 18*n'*–18*a'*.

Circulating pipe 22, which passes through condensers 18*n'*–18*a'*, further passes through heater 24 and is connected to the first evaporator 18*a* of the first evaporator group. Drain pipe 25 connected to the last evaporator 19*n* of the second evaporator group communicates with supply pipe 4 through pump 26. 27 is a drain pipe connected to condenser 19*n'* mounted to the last evaporator 19*n* of the second evaporator group, the drain being pumped through said drain pipe into drain tank 16 by pump 28. 29 is a steam pipe connected to heater 24 which heats the water passing through circulating pipe 22. 30 is an ejector connected to condenser 19*n'* to reduce the pressure of the evaporators in the order of 18*a*–18*n* and 19*a*–19*n*.

Starting fan 9 draws gas into the lower part of gas-liquid contacting device 1 through gas inlet 10 and sucks it upward while on the other hand, the water warmed while passing through the water purification machine "*a*" is sprayed out of supply pipe 4 over the filling material 6 by spray nozzle 7, with the result that the gas and the hot water are brought into contact in said filling material.

In consequence, the gas is warmed to a temperature close to that of the hot water supplied and, at the same time, a part of the hot water evaporates to generate water vapor. The hot water is cooled by the latent heat of said water vapor but, because of the water vapor contained in the gas current, the humidity increases and simultaneously, the temperature becomes close to that of the hot water. The water vapor-containing gas current passes through eliminator 8, so that water drops are removed, then enters water vapor condenser 2 through passage 3 and is cooled by the water passing through cooling pipe 5. Here the water vapor is condensed into water, which is then collected as fresh water through drain pipe 15 into drain tank 16.

Most of the brine drawn up by pump 14 is discharged from drain pipe 17 after passing through cooling pipe 5 to condense the water vapor but the remainder entering cooling pipe 20, condenses the steam in condensers 19*n*–19*a* and is warmed. A part thereof then enters supply pipe 4, is sprayed over filling material 6 in gas-liquid contacting device 1, and is collected as fresh water in the way mentioned above. The remaining part of the brine which did not enter supply pipe 4 passes through water supply pipe 21 into circulating pipe 22, is then flash-evaporated by water purification machine *a*, is thereby condensed, and is collected as fresh water through drain pipe 27. And the brine which was not evaporated even in the last evaporator 19*n* comes in part as circulating water into circulating pipe 22, and the remainder passes through drain pipe 25 into supply pipe 4 and is evaporated.

Figure 2:
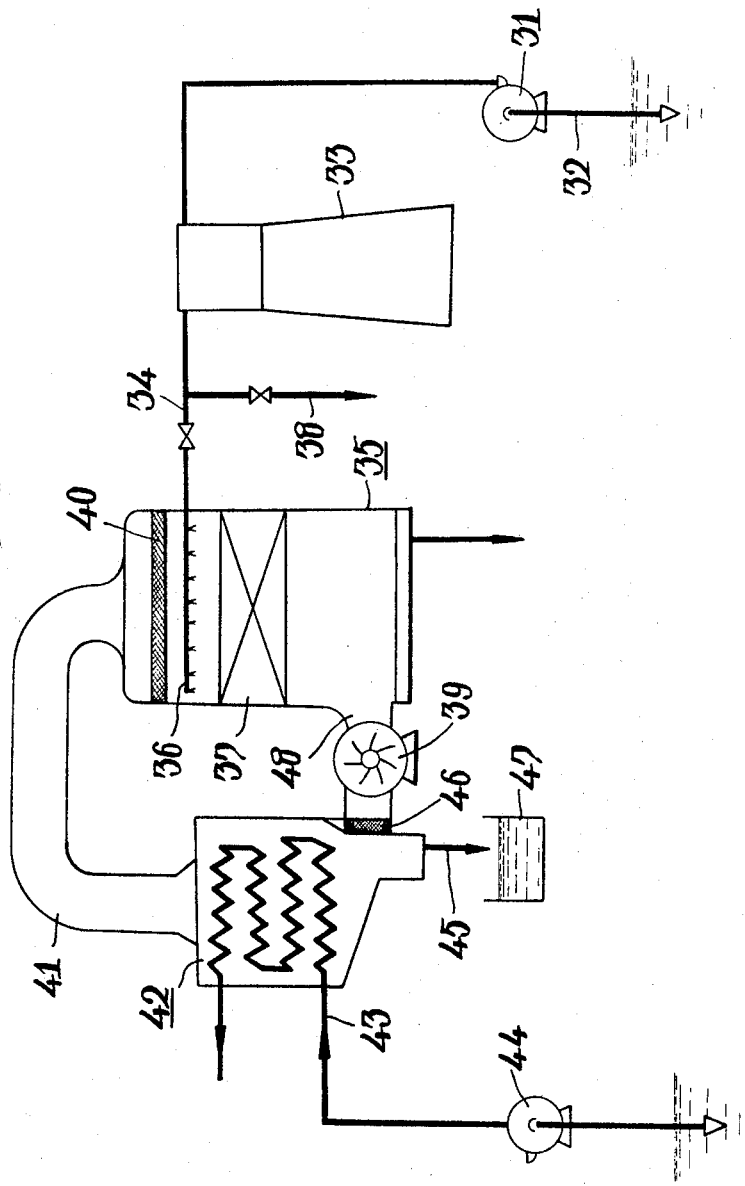
FIG. 2 is a schematic view of another embodiment of this invention for making fresh water from the water used for cooling a Diesel engine.

FIG. 2 shows an embodiment wherein fresh water is collected from the cooling water in the jacket of the diesel engine of a ship. From this embodiment, it may be understood that this invention is advantageously applicable to ships.

The brine drawn up by brine pump 31 through water intake pipe 32 and fed into the jacket of diesel engine 33 cools the engine and is thereby warmed by about 6–15° C. The brine which is usually discharged into the sea is, according to this invention, introduced by supply pipe 34 into gas-liquid contacting device 35, wherein a part of the brine is sprayed by spray nozzle 36 over filling material 37, the remainder being passed overboard through drain pipe 38. Gas-liquid contacting device 35 is shown with a filling tower, gas being blown into device 35 from the bottom by fan 39. Accordingly, the gas and the brine sprayed come in contact with each other in device 35, wherein, in the same way as in the embodiment shown in FIG. 1, a part of the brine is evaporated and mixed in the gas stream. This gas stream passes through eliminator 40, whereby water drops are removed, and is sent through passage 41 into water vapor condenser 42.

The brine drawn up by a brine pump 44 flows through cooling pipe 43 which passes through water vapor condenser 42 to condense the water vapor contained in the gas in condenser 42. The condensed water vapor is separated from the gas by eliminator 46 and collected as fresh water through drain pipe 45 into drain tank 47. The gas which passed through the eliminator 46 is blown into gas-liquid contacting device 35 from the bottom through duct 48 by fan 39.

Figure 3:
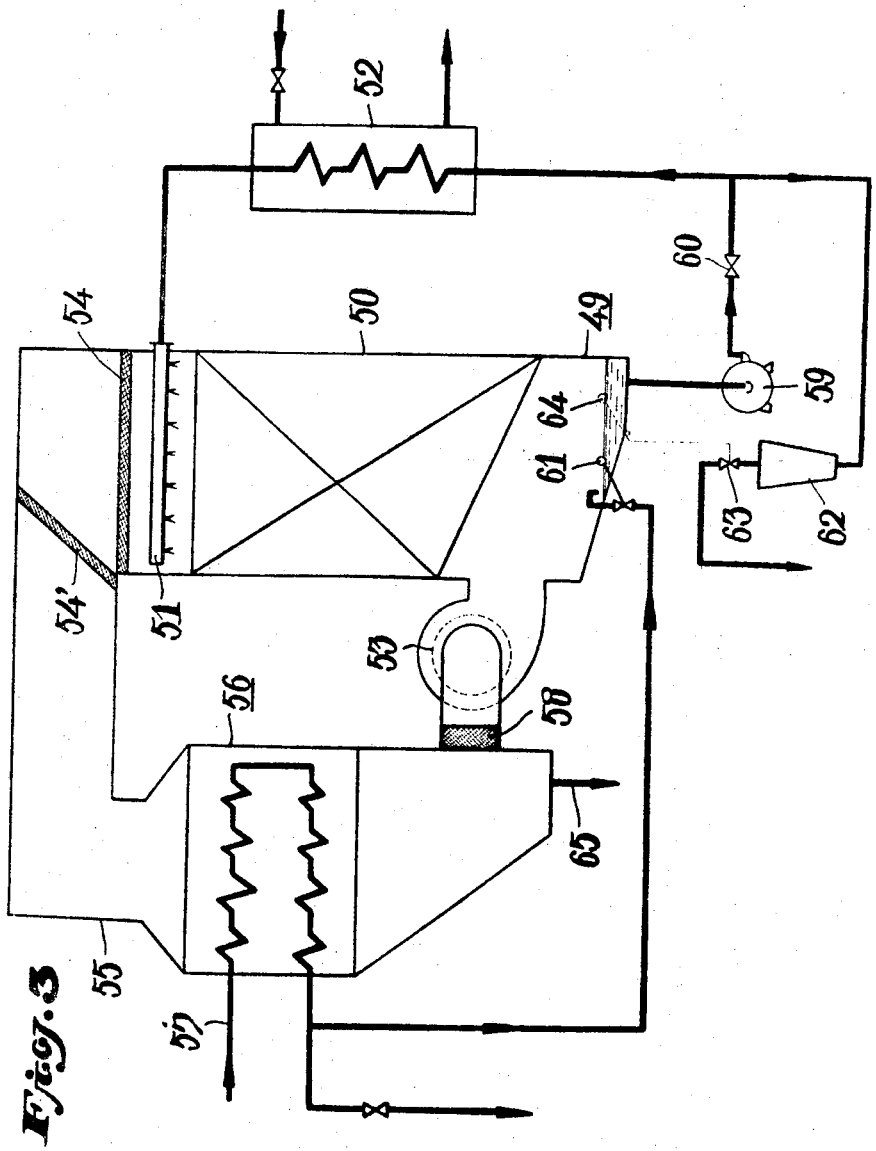
FIG. 3 is a schematic view of another embodiment of this invention.

The embodiment shown in FIG. 3 is a modification of the one shown in FIG. 2. Gas-liquid contacting device 49 is provided at the middle with filling material 50, above which spray nozzle 51 is disposed to spray the brine which has passed through heater 52. Heater 52 may be a diesel engine, a steam driven electric generation plant, or a brine evaporating apparatus. Gas is blown into gas-liquid contacting device 49 from the bottom by fan 53 and sucked upward through filling material 50. Accordingly, the brine sprayed from the top and the gas stream blown upwardly from the bottom contact each other in filling material 50 to cause evaporation. The water vapor-containing gas stream passes through eliminators 54 and 54', whereby the water drops are separated, and then, passing through passage 55, enters water vapor condenser 56 from the top and is cooled by the brine passing through cooling pipe 57 in said water vapor condenser. Thus the water vapor contained in said gas stream is condensed and collected as fresh water through drain pipe 65 at the bottom of said water vapor condenser 56. Also, the condensed brine deprived of its latent heat in filling material 50 collects at the bottom of gas-liquid contacting device 49. Fan 53 is provided at a position lower than cooling pipe 57 in water vapor condenser 56. Said fan blows the gas deprived of moisture in condenser 56 into gas-liquid contacting device 49 from the bottom through eliminator 58. Accordingly, the gas circulates through gas-liquid contacting device 49 and water vapor condenser 56. The brine collected at the bottom of gas-liquid contacting device 49 is sent through pump 59 and check valve 60 to heater 52 so as to be mixed in a fixed concentration with the brine used for cooling and sprayed over filling material 50. Ball tap 61 detects the water level of the brine collected, and while controlling the flow of the brine which has passed through cooling pipe 57 in water vapor condenser 56, allows a part thereof to flow into the bottom of gas-liquid contacting device 49, the greater part of said brine being discharged. A flow meter 62, which measures the flow rate to heater 52, adjusts valve 63 to discharge the brine-containing raw material water to be sent through check valve 60 to heater 52.

The concentration of the water to be sprayed over the filling material 50 may be kept constant by means other than that of the above embodiment. For example, when the flow rate of the cooling water to be discharged from cooling pipe 57 in water vapor condenser 56 is constant, it suffices to supply said cooling water into the system at an optional position thereof between the outside of the bottom of gas-liquid contacting device 49 and spray nozzle 51, detect the water level of the brine by ball tap 64 and adjust the degree of opening of valve 63. Thus, in this invention, it is also possible to make fresh water by repeatedly supplying brine to water warmed while condensing the water vapor.

What is claimed is:

1. A water purification apparatus comprising in combination:
   (a) a multistage flash evaporating water purification unit including heating means, evaporators and condensers for receiving impure water, evaporating at least a part of said impure water and condensing and discharging pure cooled water;
   (b) a second water purification unit comprising a gas-liquid contacting tower including a lower gas inlet, fan means to direct gas upwards through the tower, an upper spray means for spraying impure water downwards, said spray means receiving impure water from said evaporators, filling means to enhance gas liquid contact disposed between said upper spray means and said lower gas inlet, filter means above said spray means to remove water drops but allowing vapor to pass and an upper outlet duct receiving said passing vapor;
   (c) a water vapor condenser coupled to said outlet duct condensing at least a part of said vapor and discharging pure water; and
   (d) inlet flow means including pump means feeding impure water to said flash evaporating unit across said water vapor condenser to cool and condense vapor into water passing therethrough.

References Cited

UNITED STATES PATENTS

| 3,218,241 | 11/1965 | Checkovich | 203—7 |
| 3,433,717 | 3/1969 | Loebel | 202—173 |
| 3,458,972 | 8/1969 | Sood | 202—176X |
| 3,480,515 | 11/1969 | Goeldner | 202—183X |
| 1,379,502 | 5/1921 | De Woern | 203—49UX |
| 2,358,559 | 9/1944 | Clemens | 203—11X |
| 2,372,846 | 4/1945 | Nettel et al. | 203—49UX |
| 2,444,527 | 7/1948 | Pomeroy | 203—49X |
| 3,234,109 | 2/1966 | Lustenader | 203—11 |
| 3,388,045 | 6/1968 | Goeldner et al. | 203—11X |
| 3,425,914 | 2/1969 | Kanaan | 203—10X |

WILBUR L. BASCOMB, JR., Primary Examiner

D. EDWARDS, Assistant Examiner

U.S. Cl. X.R.

202—180, 233, 236; 203—11, 73, 81, 100